June 11, 1929.  H. D. WILSON ET AL  1,716,610
STORAGE BATTERY
Filed Jan. 2, 1925
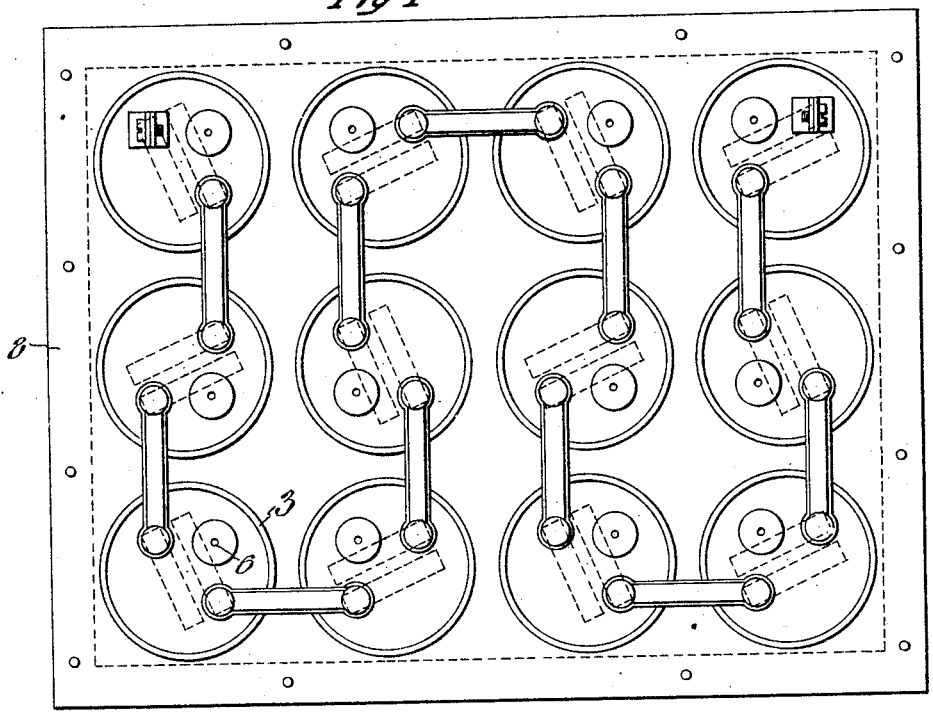
Fig I
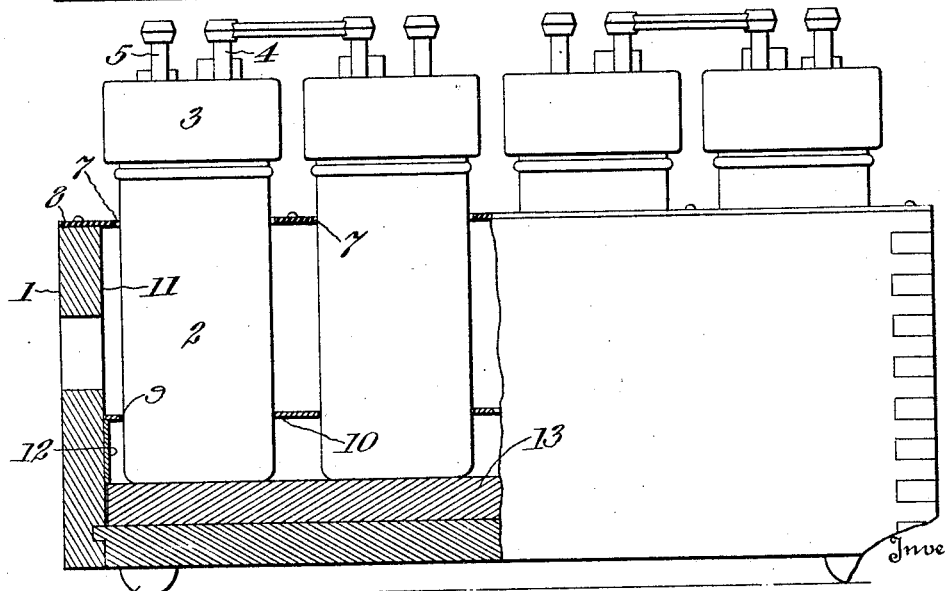
Fig II Patented June 11, 1929.

1,716,610

UNITED STATES PATENT OFFICE.

HARLAND D. WILSON AND ALBERT L. HOPKINS, OF INDIANAPOLIS, INDIANA, ASSIGNORS, BY MESNE ASSIGNMENTS, TO PREST-O-LITE STORAGE BATTERY CORPORATION, A CORPORATION OF INDIANA.

STORAGE BATTERY.

Application filed January 2, 1925. Serial No. 186.

This invention relates to storage batteries, particularly to storage batteries of the radio "B" type. Such batteries consist of a comparatively large number of unit storage cells connected in series circuit to produce the high voltage required for the plate circuit of a vacuum tube, for example. In order to arrange these cells as compactly as possible for handling and storage, they are assembled in parallel rows in a suitable case or box, in which arrangement there is a substantial difference of potential between certain correspondingly situated cells in adjacent rows. As a result, there is apt to be considerable leakage of current between such cells, especially in instances where spilled or escaped acid electrolyte has collected along the sides of the cell jars and on the bottom of the box containing them. Moreover, such escaped or spilled electrolyte is likely to do other damage, particularly when the battery is used in connection with a radio set and near clothing, rugs, etc.

Accordingly, the principal objects of this invention are to provide means whereby the jars of the individual cells of the battery shall be held in spaced relation relatively to one another; and to provide a common supporting pad or cushion for such cells having an electrolyte absorbing and neutralizing means incorporated therein.

Other objects and advantages will hereinafter appear.

In the drawing Figure 1 is a plan view of the battery; and Figure 2 is a front elevation, partly broken away.

For the purpose of illustrating this invention, the battery may consist of twelve storage series-connected battery cells mounted in a box 1 and arranged in numerous short parallel rows, three series-connected cells being disposed in each row and the series connections between the rows of cells being alternately adjacent opposite sides of the box. This arrangement is advantageous because it provides a comparatively low difference of potential between any correspondingly located cells in adjoining rows. Each cell comprises a jar or container 2 which is formed of a suitable insulating material, preferably glass, and an insulating jar cover 3 which may be formed of hard rubber. Inside the container are positive and negative electrodes which have terminal posts 4 and 5 that fit tightly in the rubber cover 3 and extend through it. The electrodes are disposed in a suitable electrolyte such as sulfuric acid.

Electrolyte is apt to be carried out of the cells in various ways. Escaping gas carries some of the electrolyte out through vent openings 6 in the cell covers, causing it to be deposited upon and around the cells and the cell terminals 4 and 5. The electrolyte which escapes tends to spread and such spreading may be assisted by the spilling of distilled water or electrolyte intended for replenishing the battery. Sulfuric acid has no tendency to dry up by evaporation, but on the contrary extracts water from the air, so that it goes on spreading until it is absorbed or is combined to form a non-hygroscopic compound.

The escaped or spilled electrolyte is capable of doing serious damage. If it leaks onto the battery stand it will ruin the finish thereof. If it spreads and forms conducting paths between the terminals of different cells it will cause leakage of current, which will impair the efficiency of all the cells drained by such leakage, and will, unless detected in time, damage the cells.

It is an important object of this invention to prevent the spread of electrolyte in a manner which might cause current leakage or other damage. The unit cells are spaced apart by any suitable or convenient means, for example by fitting loosely in spaced openings 7 in the top 8 of the battery box and in similar spaced openings 9 in a templet 10 near the bottom of the containers. The box top 8 is of acid-resistant insulating material, such as hard sheet rubber and the templet 10 may consist of suitable material such as fiber board coated with an acid-resistant paint. The openings in the spacing plates 8 and 10 are in line and of slightly larger size than the jars, whereby they fit around the cell jars so loosely that they have little chance to catch any electrolyte that may run down the sides of the cell jars. The spacing templet 10 fits the cell assembly a short distance above the lower ends of the cells and is marginally supported in that position by a flange or spacer 12 that abuts against the inside surface of the box 1. The top 8 may be secured to the upper edge of the box 1, which is desirably of such a height as to indicate the proper electrolyte level to be maintained. If desired, a suitable removable cover may be provided to enclose the upper ends of the cell assembly.

The cells, the spacer 12 and the templet 10 are supported upon a porous acid absorbing and neutralizing cushion pad 13 that covers the entire bottom of the box and fits closely against the side walls 11. This pad may consist of a matting of vegetable fibers or a dried mixture of such materials as cement, asbestos, diatomaceous earth, sodium silicate and water, or matted glass wool impregnated with a chemical substance such as sodium carbonate or set cement capable of neutralizing electrolyte acid. The electrolyte which finds its way to the cushion 13 is quickly absorbed and neutralized and has no opportunity to join with electrolyte leaking from other cells. The establishment of current conducting paths between cells by the escaped or spilled electrolyte is thus avoided.

The absorption and neutralization of the electrolyte within the battery box also protects the battery supporting table or cabinet against disfiguration and protects against acid burns, damage to clothing, etc., in handling the battery.

The pad 13 besides absorbing and neutralizing the electrolyte, is a common yieldable support for all the cells and serves as a shock absorber to cushion the jolts they may receive in transportation and handling. By diminishing the violence with which the cells are shaken about, the pad tends to prevent slopping out of the electrolyte, and protects the cell jars 2 against breakage. Rubber supporting feet 14 on the bottom of the battery box also contribute to these results.

Variations may be resorted to within the scope of the invention; as to the composition of the absorbent pad, the neutralizing chemicals employed, and the disposition of cell spacing means and the absorbing and neutralizing means with reference to the battery cells. The cell spacing means and the absorbing and neutralizing pad or block may be used with other types of batteries than the particular one described.

We claim:

1. In a battery, the combination with a plurality of cells, of a case therefor, a templet of hard sheet rubber having openings that loosely receive the cells and position them in spaced relation, and means in said case for catching and combining with escaped or spilled electrolyte to prevent the formation of current conducting paths between cells by such electrolyte.

2. In a storage battery, the combination with a battery box, of a group of cells therein, means for positioning the cells in spaced relation, comprising a templet near the bottoms of the cells and a box cover near the tops of the cells, the templet and the box cover being of insulating material and having openings loosely surrounding the cells, and a pad of matted vegetable fibers supporting the cells, said pad being impregnated with sodium carbonate for neutralizing spilled or escaped electrolyte.

3. In a storage battery, the combination of a plurality of series-connected unit storage cells, each cell comprising a jar, a cover therefor, and the electrical connections being disposed above such covers; a box for holding said cells having its upper edge disposed below the plane of said covers; plate means having spaced openings adapted to fit said jars between their upper and lower ends and space them apart; and an electrolyte absorbing and neutralizing pad in said box providing a common cushion support for said cells.

4. In a storage battery, the combination of a plurality of series-connected unit storage cells arranged in parallel rows, each cell comprising a jar and a cover therefor and the electrical connections being disposed above such covers; a box for holding said cells having its upper edge disposed below the plane of said covers; an insulating plate of acid-resistant material secured to said upper edge and having spaced openings fitting the cell jars below said covers; an electrolyte absorbing and neutralizing pad covering the bottom of said box and providing a common support for said cells; and a second insulating plate of acid-resistant material having spaced openings fitting the cell jars near but above the bottom ends thereof.

In testimony whereof, we affix our signatures.

HARLAND D. WILSON.
ALBERT L. HOPKINS.